US010318516B1

(12) United States Patent
Taylor

(10) Patent No.: US 10,318,516 B1
(45) Date of Patent: Jun. 11, 2019

(54) SYSTEM FOR OPTIMIZING SERIALIZATION OF VALUES

(71) Applicant: Amazon Technologies, Inc., Seattle, WA (US)

(72) Inventor: Gary Taylor, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 467 days.

(21) Appl. No.: 14/862,019

(22) Filed: Sep. 22, 2015

(51) Int. Cl.
*G06F 7/00* (2006.01)
*G06F 17/30* (2006.01)
*G06F 16/22* (2019.01)
*G06F 16/28* (2019.01)

(52) U.S. Cl.
CPC ........ *G06F 16/2291* (2019.01); *G06F 16/285* (2019.01)

(58) Field of Classification Search
CPC .... G06F 16/2291; G06F 16/285; G06F 8/427; G06F 9/44589; G06F 9/45508; G06F 9/4493
See application file for complete search history.

(56) References Cited

U.S. PATENT DOCUMENTS

| | | | | |
|---|---|---|---|---|
| 5,760,787 A | * | 6/1998 | Piper | G06T 9/001 345/442 |
| 7,389,395 B1 | * | 6/2008 | Garthwaite | G06F 12/0253 707/999.202 |
| 2009/0193035 A1 | * | 7/2009 | Benayon | G06F 17/30011 |
| 2012/0221540 A1 | * | 8/2012 | Rose | G06F 17/30168 707/706 |
| 2013/0232229 A1 | * | 9/2013 | Firman | G06F 8/61 709/219 |

* cited by examiner

*Primary Examiner* — Azam M Cheema
(74) *Attorney, Agent, or Firm* — Davis Wright Tremaine LLP

(57) ABSTRACT

A first value of a first data type is obtained as input. A second value of a second data type is obtained based at least in part on the first value. The second value is determined to match the first value without losing precision. The second value is determined to be greater than a maximum value for a third data type, and less than or equal to a maximum value for a fourth data type. A marker value is stored in a first storage location, the marker value indicating that a second storage location holds a value of the fourth data type. The second value is stored in the second storage location as the fourth data type.

20 Claims, 11 Drawing Sheets

SYSTEM FOR OPTIMIZING SERIALIZATION OF VALUES

BACKGROUND

Often, in computing environments, data values are calculated or obtained in a particular data type format that requires a certain amount of space for storage. However, such data values calculated or collected are often relatively small compared to the space reserved by the particular data type, causing more space to be allocated for storage of the data values than is actually needed. Although compressing the data values prior or subsequent to storage may result in a more efficient use of storage space, use of compression algorithms can be costly in terms of resource usage.

BRIEF DESCRIPTION OF THE DRAWINGS

Various embodiments in accordance with the present disclosure will be described with reference to the drawings, in which.

DETAILED DESCRIPTION

Figure 1:
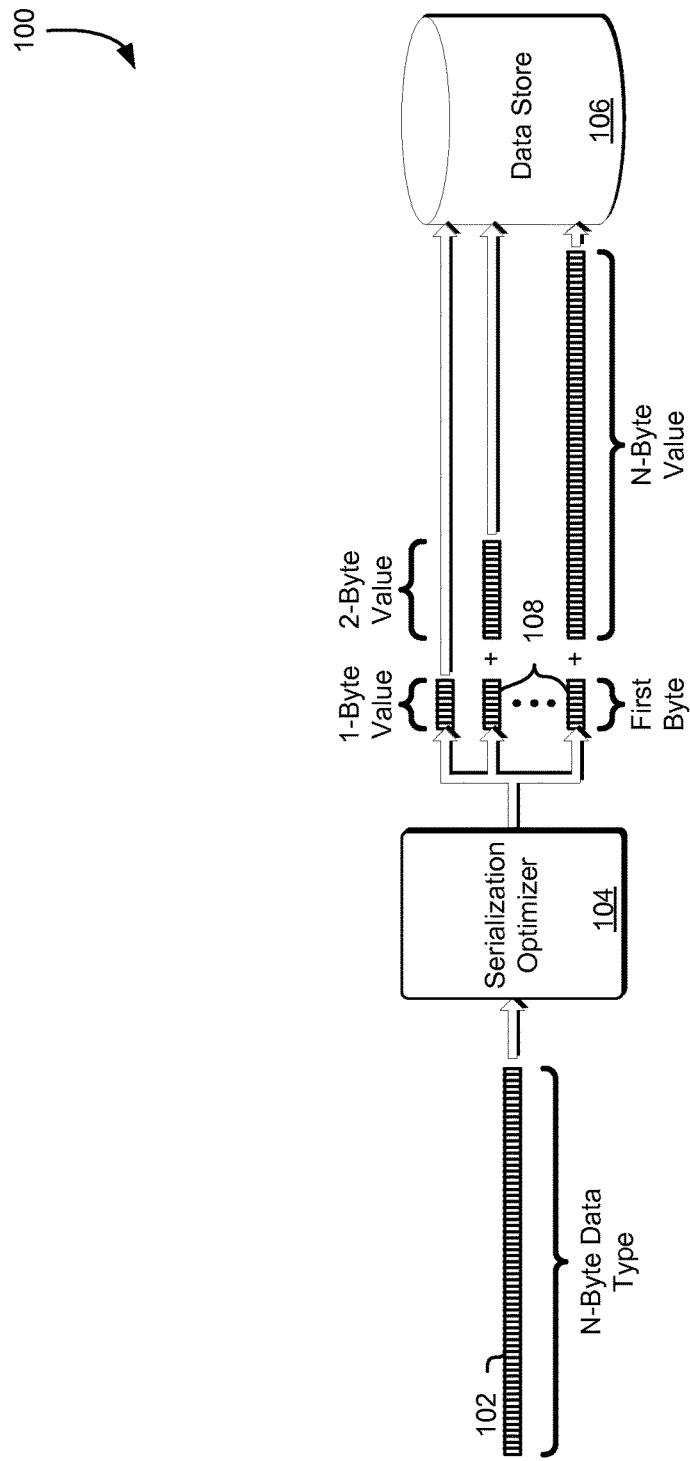
FIG. 1 illustrates an example of optimized serialization of a data type in accordance with an embodiment.

In one example, a serialization optimizer may obtain, as input, a value of a first data type. The serialization optimizer may determine whether the value can be translated (or cast), without losing precision, into at least one of a number of predetermined data types. If the serialization optimizer determines that the value can be translated (i.e., is translatable) without loss of precision into at least one of the number of predetermined data types, the serialization optimizer may next determine which of the predetermined data types to translate the value into for optimized storage.

For example, if the value is less than or equal to a maximum value for the smallest data type of the predetermined data types (e.g., smaller than a byte in size) and the value does not equal a number that has been reserved for certain markers that indicate certain data types (e.g., a marker value of 255 may indicate a data type of short integer, a marker value of 254 may indicate a data type of long integer, a marker value of 253 may indicate a data type of double-precision floating-point, etc.), the value may be output as a value of the smallest data type for storage in a first storage location (e.g., a first byte of storage). As an example, if the value equals 124, which may be stored using only one byte of storage, the value 124 may be stored in the first byte of storage.

On the other hand, if the value is greater than the maximum value for these smallest data type, or if the value equals a number that has been reserved for certain markers, the serialization optimizer may next determine whether the value should be output and stored as the next smallest data type. That is, if the value is less than the maximum value of the next smallest data type, a marker value indicating that the data type being output is of the next smallest data type may be output for storage in the first storage location (e.g., the first byte of storage), and the value itself may be output for storage as a value of the next smallest data type for storage in a second storage location. For example, in a case where the value is 1,575, the value is too large to be stored in one byte of storage, but the value is small enough to be stored as a short integer in two bytes of storage. In such a case, a marker value indicating that the value is being stored as a short integer may be stored in a first byte of storage, and the value 1,575 may be stored in the next two bytes of storage.

However, if the value cannot be translated (i.e., is not translatable) without loss of precision into at least one of the number of predetermined data types, or if the value cannot otherwise be stored as any of the predetermined data types (e.g., the value is greater than the maximum value of the largest predetermined data types), the serialization optimizer may instead determine to store the value as its original data type. In doing so, a marker value indicating the data type being stored may be output for storage in the first storage location (e.g., the first byte of storage), and the value itself may be output for storage as a value in a second storage location (e.g., the next four bytes, the next eight bytes, etc. as needed). For example, if the value is 2,251,799,813,685, 248 and is received as a double-precision data type, the value would be too large to be stored in a single byte or even as a short integer in two bytes. Consequently, a marker value indicating that the value is being stored as a double-precision number may be stored in the first byte storage, and the value 2,251,799,813,685,248 may be stored in the next eight bytes of storage.

In the previous and following description, various techniques are described. For purposes of explanation, specific configurations and details are set forth in order to provide a thorough understanding of possible ways of implementing the techniques. However, it will also be apparent that the techniques described may be practiced in different configurations without the specific details. Furthermore, well-known features may be omitted or simplified to avoid obscuring the technique being described.

Techniques described and suggested in the present disclosure improve the field of computing, specifically the field of data serialization, by providing a technique for writing data in a compact format and reading and translating the compact data into its original format quickly and efficiently. Additionally, techniques described and suggested in the present disclosure improve the efficiency of data storage by storing small values of larger data types as smaller data types, in some cases with a marker specifying the larger data type of the small value, thereby saving storage space that would have otherwise been allocated to the larger data type. Moreover, techniques described and suggested in the present disclosure are necessarily rooted in computer technology in order to overcome problems specifically arising with the excessive storage resources needed to store small values in large data types by converting the small values to small data types for storage without a loss of precision.

FIG. 1 illustrates an example embodiment 100 of the present disclosure. Specifically, FIG. 1 depicts a technique for serializing input values for optimized data storage. In the example embodiment 100, an input value 102 of a data type provided to a serialization optimizer 104, which may transform the input value 102 into a smaller data type for storage in the data store 106. The input value 102 may be of a data type of length N-bytes (e.g., an input value 102 that is an 8-byte double-precision floating-point value). That is, the input value 102 may be 9, 49, 1083, or 867.5309, but may be received as a data type that requires N-bytes of storage (e.g., 4-bytes, 8-bytes, 16-bytes, etc.).

The input value 102 may be received through a network in a message comprising one or more packets. The message may be parsed by the one or more processors of system of the present disclosure to identify and extract the input value 102 from the message. The input value 102 extracted may be caused to be stored in memory, such as the volatile memory of the system, by the one or more processors. The input value 102 may be a value formatted to any of a variety of data types. In some examples, "data types" may refer to various formats for storing data as bits or bytes in a storage medium of a computing device. Examples of data types are 2-byte integers, 4-byte integers, 8-byte integers, 16-byte integers, half-precision floating-point numbers, single-precision floating-point numbers (e.g., Institute of Electrical and Electronics Engineers (IEEE) 754-2008 standard), double-precision floating-point numbers (e.g., IEEE 754 standard), double extended-precision floating-point numbers, quadruple-precision numbers, dates, strings, alphanumeric characters, decimal64, and Boolean values. Each data type format may be expressed in accordance with a particular scheme. For example, the IEEE 754 standard for double-precision floating-point numbers (also known as binary64) specifies that one bit is reserved for sign, 11 bits are reserved for an exponent value, and 52 bits are reserved for a fraction value. Thus, expressing such a double-precision floating-point number requires 64-bits; in other words, the maximum value of a double-precision floating-point number cannot be expressed using less than eight bytes of data. Likewise, an unsigned short integer is a non-fractional number from 0 to 65,535 (i.e., $2^{16}-1$). Consequently, expressing the maximum value of a short integer requires 16-bits; in other words, the 65,535 cannot be expressed in binary using less than two bytes. Similarly, an unsigned byte is a non-fractional number from 0 to 255 (i.e., $2^8-1$), and consequently cannot be expressed in binary using less than one byte (i.e., eight bits).

The input value 102 may be one of many input values collected by a monitoring service or agent configured to monitor one or more computing resources provided to customers of a computing resource service provider or configured to monitor applications running under virtual machine instances on such resources. For example, the input values may include values relating to users of the virtual machines, such as Internet protocol addresses, timestamps corresponding to access times by users, ping times, quantities of data sent or received by a particular user within a given range of time, etc.

Data may be represented as a physical expression of a measurable phenomenon, which, for computing devices, typically comprises electric voltages and magnetic interactions. For example, north and south magnetic fields may represent either of two states (0 or 1) of a binary digit. Likewise, an electric voltage of at or below a first threshold value (e.g., zero, five volts, etc.) may represent a state of 0, and an electric voltage above a second threshold value (which may be the same as the first threshold value: e.g., one volt, five volts, twelve volts, etc.) may represent a state of 1 of the binary digit. However, data may also be represented by other phenomena, such as electromagnetic, pressure, chemical, biological, molecular, atomic, sub-atomic, and quantum interactions. Other phenomena can represent digits of a higher base. For example, a superposition of multiple simultaneous quantum states before measurement may be represented by a quantum bit (qubit).

The serialization optimizer 104 may be hardware or software configured to cause a computing device to determine whether and how to store the input value 102 as a smaller data type in the data store 106. For example, if the input value 102 is 9 or 49, the serialization optimizer 104 may determine that the input value 102 can be translated into a data type that requires only one byte of storage, causing the computing device to store the input value 102 using just one byte (e.g., a first byte). On the other hand, the input value 102 of 1083 may require two bytes of storage. In this case, one byte (e.g., the first byte) may be used to store a marker value 108 that indicates that the data being stored can be found in the next two bytes of storage. Then the serialization optimizer 104 may cause the computing device to store the input value 102 in the next two bytes of storage. Note that in the first case, where the input value 102 is stored using just one byte, no marker value 108 is used. In this manner, if that one byte contains the input value 102 that is not a marker value, it can be quickly determined to be the actual value stored. Note too that in the second case, although three bytes of storage were used to store two bytes of data (that is, two bytes for the input value 102 and one byte for the marker value 108), if the data type of the input value 102 has a length greater than three bytes, a reduction in storage space for the input value 102 is still achieved.

However, in an example where the input value 102 is 867.5309, it may be that the serialization optimizer 104 determines that it is either unable to store the input value 102 as a smaller data type than the original data type, or that storing the input value 102 as a smaller data type does not yield a significant benefit in storage or processing efficiency, and consequently may store the input value 102 in the data store 106 in its original data type. In this case, a marker value 108 may be stored in the first byte indicating the data type being used to store the data. Such determinations may be dependent upon factors such as the programming language or the hardware being used in translating and storing the input values. For example, it may be that the resource usage necessary to translate an 8-byte double-precision input value into a 4-byte single-precision value for storage outweighs the benefit of saving only three bytes of storage (eight bytes, minus four bytes, minus one byte for the marker value 108). However, it is contemplated that the serialization optimizer 104 may translate data types of N bytes into any number of data types requiring one to N bytes for storage.

In a distributed computing environment of a computing resource service provider, the computing resource service provider may, for any of a variety of reasons (e.g., contract with customer, for detecting performance or security issues, performance improvement purposes, etc.), have one or more components designed to monitor usage of resources hosted by the computing resource service provider for its customers. Such one or more components may collect this usage data and store it in a data store for later use. The serialization optimizer 104 may be a subcomponent of just such a component. For example, the input values may be values reflecting a percentage of processor usage at a given time. A contract with the customer may require that the computing resource service provider receive the input values as a double-precision data type. However, the vast number of input values received may be small integer numbers (e.g., integers ranging from 0 to 100). Such input values may be translated by the serialization optimizer 104 into data types that can be stored within a single byte of data rather than the eight bytes of data required for double-precision numbers, without a loss in precision. In other words, if the input value can be expressed (i.e., represented) with a single byte without a loss of precision, the serialization optimizer 104 may store the value within a single byte. As the input values are collected over time, the savings in storage space can be significant. As another example, the input values may reflect light intensity of various points in a night sky. While some of the collected input values, such as for points having intense light values, may be values requiring multiple bytes of storage, at least a predetermined percentage (e.g., more than 50%, or a vast majority, such as 80%, 90%, or more) of the collected input values may be of low or no intensity, and may be able to be stored as a smaller data type without a loss of precision.

The data store 106 may be may be a repository for data objects, such as database records, flat files, and other data objects. Examples of data stores include file systems, relational databases, non-relational databases, object-oriented databases, comma-delimited files, and other files. In some implementations, the data store 106 is a distributed data store. Thus, the data store 106 may be used to store the input values received by the serialization optimizer 104.

An example algorithm for serializing input values in a manner of the present disclosure can be seen below:

```
void writeValue(Output oOut, double dValue)
{
    Int64 lValue = (Int64)dValue;
    If lValue == dValue && value >= 0
    {
        If lValue <= MAX_VALUE_FOR_BYTE
        {
            oOut.write((byte)(lValue));
            return;
        }
        Else if lValue <= MAX_VALUE_FOR_SHORT
        {
            oOut.write(SHORTMARKER);
            oOut.write((short)(lValue));
            return;
        }
    }
    oOut.write(DOUBLEMARKER);
    oOut.write(dValue);
}
```

As can be seen from the algorithm above, a double-precision floating-point number is received as dValue and cast as long integer lValue. Note, that the code sample above illustrates one of a variety of embodiments, and in other embodiments, the above code may be modified to cast the dValue as a floating-point number, a short or other integer value, and so on. A determination is made whether casting dValue as lValue has resulted in a loss of precision by determining whether the values are still equal. Note that in this embodiment, negative numbers are written as double-precision floating-point numbers. In the particular embodiment represented by the above algorithm, an uppermost range of byte values is reserved for marker values. Thus, the static constant MAX_VALUE_FOR_BYTE may be the highest byte value that excludes the reserved marker values; in other words, if the top three byte values (0xff (255 in decimal), 0xfe (254 in decimal), and 0xfd (253 in decimal)), MAX_VALUE_FOR_BYTE may equal 0xfc (253 decimal). If lValue is less than or equal to MAX_VALUE_FOR_BYTE, the value is output as a single byte value. Or, if lValue is less than or equal to MAX_VALUE_FOR_BYTE, but still less than the maximum value for a short integer, the constant MAX_VALUE_FOR_SHORT (0xffff), the value is output as a short integer with a marker (SHORTMARKER) indicating that the value is output as a short integer. However, if neither case is true, the value is output as a double-precision floating-point number with a marker (DOUBLEMARKER) to indicate the double-precision floating-point data type.

Figure 2:
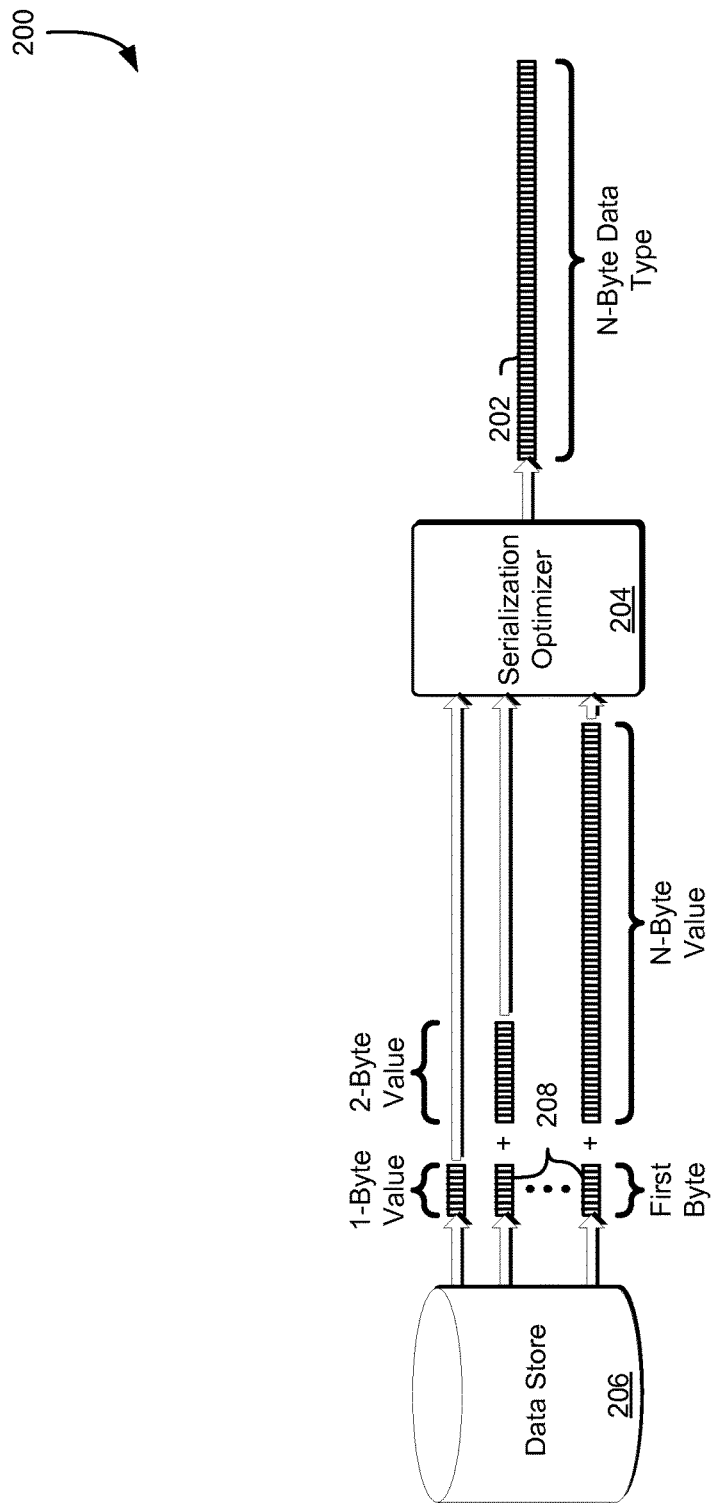
FIG. 2 illustrates an example of reading and outputting a serialized data type from storage in accordance with an embodiment.

FIG. 2 illustrates an example embodiment 200 of the present disclosure. Specifically, FIG. 2 depicts a technique for serializing values read from a data store 206 that have been stored in the optimized manner depicted in FIG. 1. In the example embodiment 200, a value that has been stored as a data type requiring from 1 to N-bytes of storage is read from the data store 206 by the serialization optimizer 204. The serialization optimizer then translates the read value from its current data type to its original data type (or whatever data type is required) to yield the output value 202.

The data store 206 may be a data store, such as the data store 106, configured for storing input values, such as the input values 102, in serialized and unserialized form in the manner described in the present disclosure. As depicted in FIG. 2, previously stored serialized input values may be retrieved from the data store 206 by the serialization optimizer 204. As an example, the serialization optimizer 204 may read a first byte of data corresponding to the serialized value, and determine whether the first byte of data contained a marker value 208. As noted in FIG. 1, the marker value 208 is a value that, where present in the first byte of data, indicates the storage location of the serialized value relative to the first byte of data. For example, if the serialization optimizer 204 does not detect that the value stored in the first byte of data is a marker value, it will indicate that the value itself is stored within the first byte of data. In such a case, the serialization optimizer 204 need only translate the first byte of data into the N-byte of data 202 for output. However, if the first byte contains the marker value 208, the value of the marker value 208 indicates to the serialization optimizer 204 how many more bytes the serialization optimizer 204 should read from the data store 206 to yield the actual stored value. For example, a marker value of 255 may indicate that the actual value is stored as a short integer in the next two bytes of storage. Similarly, a marker value of 252 may indicate that the actual value is stored as a double-precision floating-point number in the next eight bytes of storage. As noted above, because such values in the first byte may be reserved for marker values, if the actual value stored is, for example, 252, in order to avoid confusion between the marker value 208 and the actual value, the actual value may be stored in the data store 206 as a larger data type and stored in one or more next bytes (e.g., stored as a short integer in the next two bytes of storage).

As described with respect to the serialization optimizer 104, the serialization optimizer 204 may be hardware or software configured to serialize, as in the manner described in conjunction with FIG. 1, or deserialize, as depicted in FIG. 2, input values. The output value 202 then is the value read by the serialization optimizer 204 from the data store 206 and translated into the data type desired. Note that the output value 202 data type need not be the same data type as originally input. For example, if the input value 102 corresponding to the output value 202 was a single-precision floating-point number, a long integer, or some other data type, the present disclosure contemplates that the output value 202 may be any of a variety of different data types (e.g., double-precision floating-point number, string, date/time format, etc.).

An example algorithm for deserializing input values in a manner of the present disclosure can be seen below:

```
double readDouble(Buffer bBuffer)
{
   byte bValue=bBuffer.get( );
   If bValue<SHORTMARKER
   {
      return (double)bValue;
   }
   Else if bValue==SHORTMARKER
   {
      return (double)bBuffer.getShort( );
   }
   return bBuffer.getDouble( );
}
```

As can be seen from the algorithm above, a first byte is read from the buffer, bBuffer, into bValue. The system executing the algorithm determines whether the bValue is less than the lower-most marker value of a range of marker values that have been reserved to be the uppermost values of a byte. If true, the system executing the algorithm translates the byte value into a double-precision floating-point number and outputs the result. If false, the system executing the algorithm determines whether bValue is a marker indicating that the value has been stored as a short integer. If true, the system reads the next two bytes (getShort( )) from bBuffer, translates the value read into a double-precision floating-point number, and outputs the result. Otherwise, the system reads the next eight bytes (getDouble( )) and outputs the double-precision-floating point-number as read.

Figure 3:
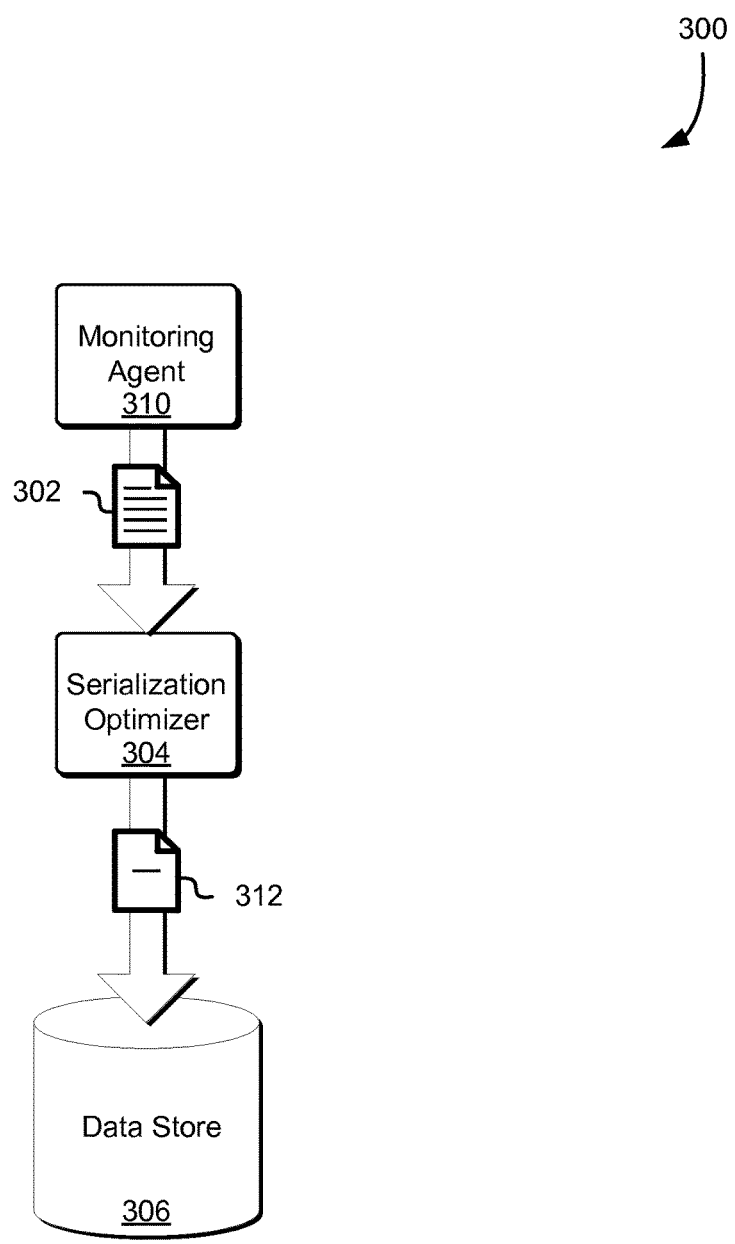
FIG. 3 illustrates an example of storing a large data type value as a single byte value in accordance with an embodiment.

FIG. 3 illustrates a possible scenario 300 of an embodiment of the present disclosure. Specifically, FIG. 3 depicts a large input value 302 received by a serialization optimizer 304 of the present disclosure from a monitoring agent 310, which is then translated to a 1-byte data type value 312 for storage in the data store 306.

The monitoring agent 310 may be an application or service configured to monitor and/or report values having a certain data type for storage in the data store. For example, the monitoring agent 310 may be a software application executing within a virtual machine instance provided to a customer of a computing resource service provider and configured to collect and report certain data about the virtual machine instance (e.g., resource usage, statistics related to user access, etc.). Similarly, the monitoring agent 310 may be a software application executing within a hypervisor managing such virtual machine instances. The monitoring agent 310 may be running at the behest of the customer and/or the computing resource service provider.

The large input value 302 may be an 8-byte double-precision floating-point number or larger data type. The serialization optimizer 304 may be similar to the serialization optimizer 104. In the scenario 300, the serialization optimizer 304 determines that the actual value of the large input value 302, despite being formatted as an 8-byte double-precision floating-point number or larger, is a number that can be expressed and stored as a single byte value without a loss of precision. Note that it is contemplated that determining that the actual value can be expressed and stored as a single byte may be accomplished in various ways. One way may be to cast/translate/transform/convert the 8-byte double-precision floating-point number as an integer and compare the resulting value with the original double-precision floating-point number (e.g., which could involve casting/translating/transforming/converting the resulting value back to a double-precision floating-point number) and seeing if the resulting value and original values still match. If they match, and the value can be expressed using a single byte (excluding values reserved for marker values), then the number is determined capable of being expressed and stored as a single byte value without a loss of precision. As a result, the serialization optimizer 304 converts/translates/transforms/casts the large input value 302 into the 1-byte data type value 312 and outputs the 1-byte data type value 312 to the data store 306 for storage. The data store 306 may be a data store similar to the data store 106 described in conjunction with FIG. 1.

Figure 4:
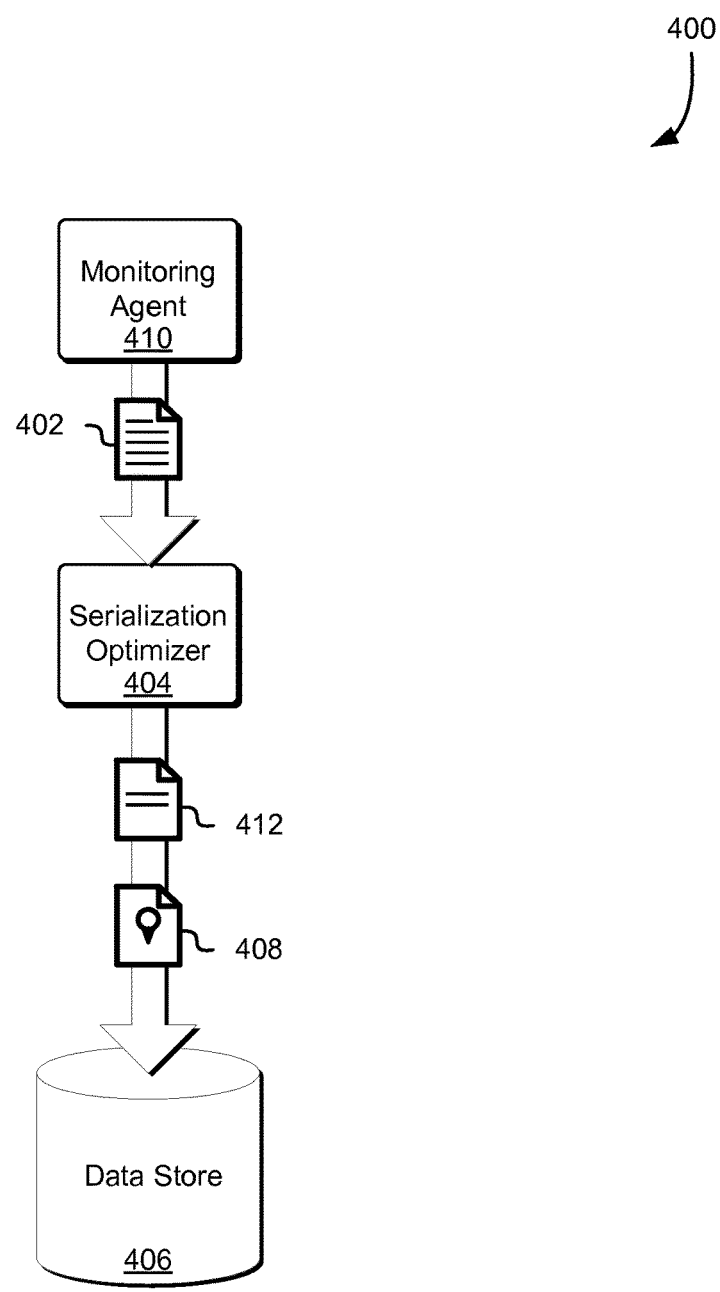
FIG. 4 illustrates an example of storing a large data type value as a smaller data type value in accordance with an embodiment.

FIG. 4 illustrates another possible scenario 400 of an embodiment of the present disclosure. Specifically, FIG. 4 depicts a large input value 402 received by a serialization optimizer 404 of the present disclosure from a monitoring agent 410, which is then translated to a smaller data type value 412 for storage in a data store 406 with a marker value 408. The monitoring agent 410 may be similar to the monitoring agent 310 described in conjunction with FIG. 3. Likewise, the large input value 402 may be a value pushed or pulled to the serialization optimizer 404 and configured in a large data type format, such as an 8-byte double-precision floating-point number or larger data type. The serialization optimizer 404 may be similar to the serialization optimizer 104 of FIG. 1. In the scenario 400, the serialization optimizer 404 determines that the actual value of the large input value 402, despite being formatted as 8-byte double-precision floating-point number or larger, is a number that can be expressed and stored as a smaller byte value (e.g., a 2-byte short integer, a 4-byte long integer (int32), a 4-byte single-precision floating-point number, etc.) without a loss of precision, but not a number so small that it can be stored within a single byte (not including numbers reserved for marker values). As a result, the serialization optimizer 404 converts/translates/transforms/casts the large input value 402 into the smaller byte value 412. Preceding output of the smaller byte value 412, the serialization optimizer 404 outputs the marker value 408 to the data store 406.

The marker value 408 may be a value that represents the particular data type corresponding to the data type of the smaller byte value 412. As an example, the value 254 may be predetermined to specify a data type of short integer, and if the smaller byte value 412 is being output as a short integer, the marker value 408 may be output as 254 to the data store 406. The data store 406 may be a data store similar to the data store 106 described in conjunction with FIG. 1, and may be configured to store the marker value 408 in a first byte, and store the smaller byte value 412 in as many subsequent bytes as is appropriate for the particular data type of the smaller byte value 412. Thus, the first byte of storage corresponding to the input value acts as a hybrid data field. That is, in FIG. 3, where the input value could fit within the first byte of storage, no marker value is used and the first byte of storage is used to store the input value. However, in cases where the input value is too large to be stored in the first byte of storage, the first byte of storage is used to store the marker value and subsequent bytes of storage are used to store the input value itself. This provides advantages where, if the vast amount of received data is small in size, much of that received data can be stored within single bytes, saving both storage space and saving compute time by enabling the actual value to be read quickly from just one byte of storage.

Figure 5:
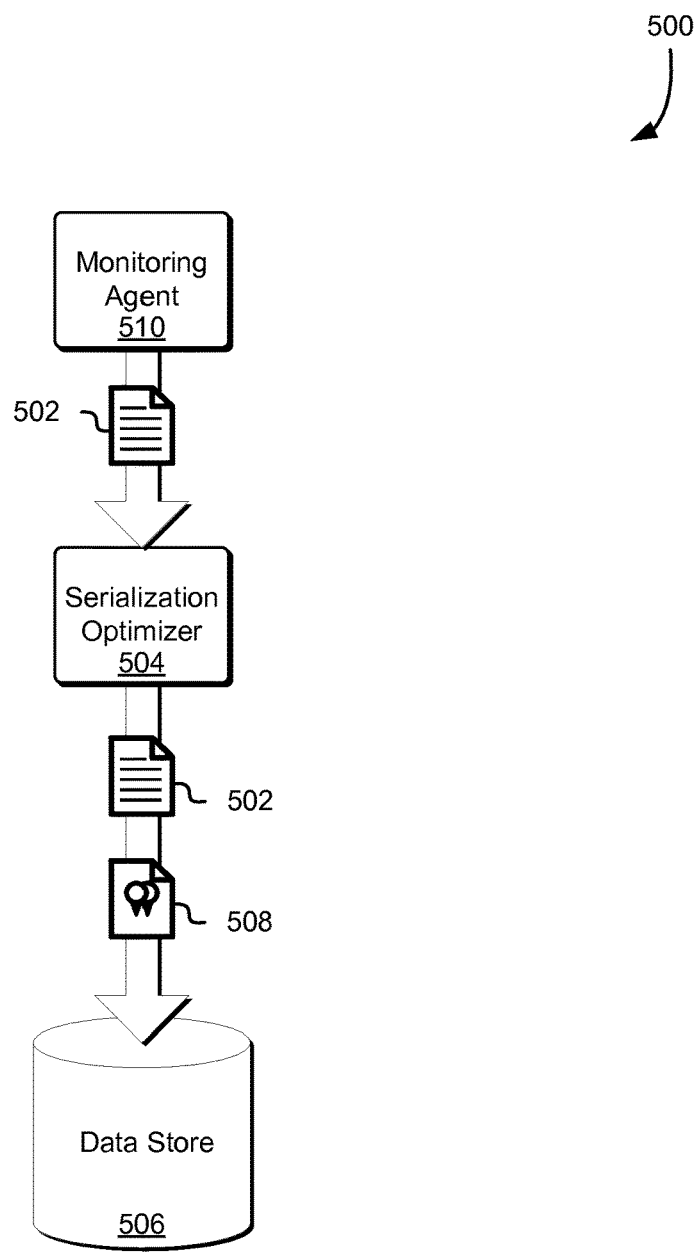
FIG. 5 illustrates an example of storing a large data type value in its original data type in accordance with an embodiment.

FIG. 5 illustrates still another possible scenario 500 of an embodiment of the present disclosure. Specifically, FIG. 5 depicts a large input value 502 received via serialization optimizer 504 of the present disclosure from a monitoring agent 512, which is then output with a marker value 508 for storage in a data store 506. The monitoring agent 510 may be similar to the monitoring agent 310 described in conjunction with FIG. 3. Likewise, the large input value 502 may be a value pushed or pulled from the monitoring agent 510 to the serialization optimizer 504 configured in a large data format, such as an 8-byte double-precision floating-point number or larger data type. The serialization optimizer 504 may be similar to the serialization optimizer 104 of FIG. 1. In the scenario 500, the serialization optimizer 504 determines that the actual value of the large input value 502 should not (e.g., resource cost is unacceptably high) or cannot be stored as a smaller data type value without a loss of precision. As a result, the serialization optimizer 504 outputs the large input value 502 in its original data type. However, preceding this output, the serialization optimizer outputs the marker value 508 to the data store 506.

Similar to the marker value 408 of FIG. 4, the marker value 508 may be a value that represents the particular data type being stored, which in this case is the data type corresponding to the large input value 502. As an example, the value 255 may be predetermined to specify a data type of double-precision floating-point, and if the large input value 502 is a double-precision floating-point number, the marker value 508 may be output as 255 to the data store 506. The data store 506 may be data store similar to the data store 106 described in conjunction with FIG. 1, and may be configured to store the marker value 508 in a first byte, and store the large input value 502 in as many subsequent bytes as is appropriate for the particular data type of the large input value 502.

Figure 6:
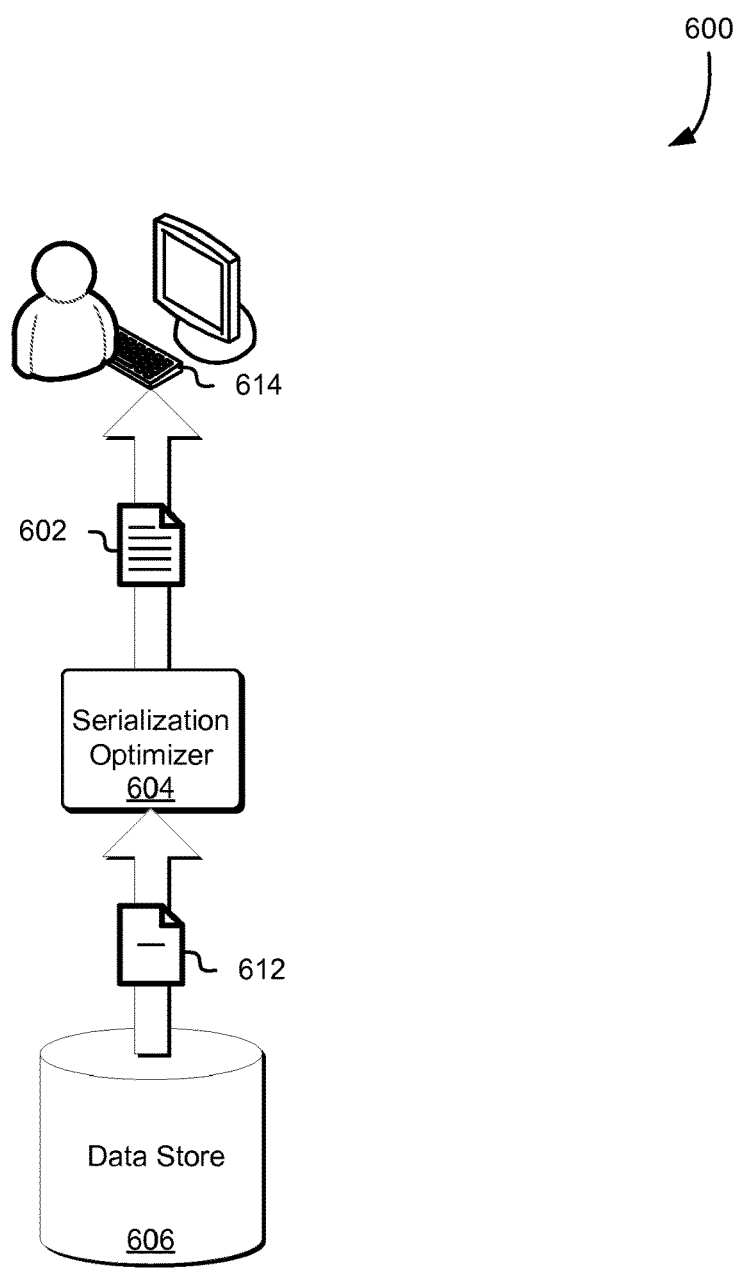
FIG. 6 illustrates an example of outputting a single byte value as a larger data type value in accordance with an embodiment.

FIG. 6 illustrates a scenario 600 of an embodiment of the present disclosure. Specifically, FIG. 6 depicts a serialization optimizer 604 retrieving a value 612 that has been stored in a data store 606 in a single byte, and outputting, to a requesting entity 614, the value 612 as an output value 602 having a larger data type than the data type of the value 612. The data store 606 may be similar to the data store 106 described in conjunction with FIG. 1. The value 612 may be a value that was stored in the data store 606 in a first byte. In embodiments where the first byte may be used for storing marker values, the actual value of the value 612 may be a value smaller than the smallest marker value. Thus, as a result of the serialization optimizer 604 determining that the first byte holds a value less than the smallest marker value, the serialization optimizer determines that the first byte contains the actual value being sought.

The serialization optimizer 604 may be similar to the serialization optimizer 204 of FIG. 2. The serialization optimizer 604 next converts/translates/transforms/casts the value 612 as the desired data type for the output value 602. In other words, if the output value 602 is desired to be a double-precision floating-point number, the value 612 may be translated to a double-precision floating-point number to be output as the output value 602. For example, the requesting entity 614 may be a customer of a computing resource service provider that, as part of a contract with the computing resource service provider, requires certain collected data to be collected and received as double-precision floating-point numbers. However, if the actual values are low enough that they can be stored in fewer bytes than the eight bytes required for double-precision floating-point numbers without loss of precision, the computing resource service provider may utilize a serialization optimizer to convert input values from double-precision floating-point numbers to smaller data types for storage. Then, in response to a request to retrieve the values, the serialization optimizer may retrieve and convert them back into double-precision floating-point numbers. In this manner, the integrity of the customer's data is preserved and provided to the customer in the desired format, while the computing resource service provider gains the benefit of more efficient use of storage with a small cost attributed to the serialization and deserialization by the serialization optimizers.

The requesting entity 614 may be the aforementioned customer of the computing resource service provider or any other entity (e.g., an individual, a service, a running application, computing device, etc.) with authorization to request and receive the output value 602. Note that in some cases, the data type of the output value 602 is not necessarily the data type of the corresponding original input value. For example, in an implementation, input values may be received as single-precision floating-point numbers, but the requesting entity specifies that the output values should be double-precision floating-point numbers.

Figure 7:
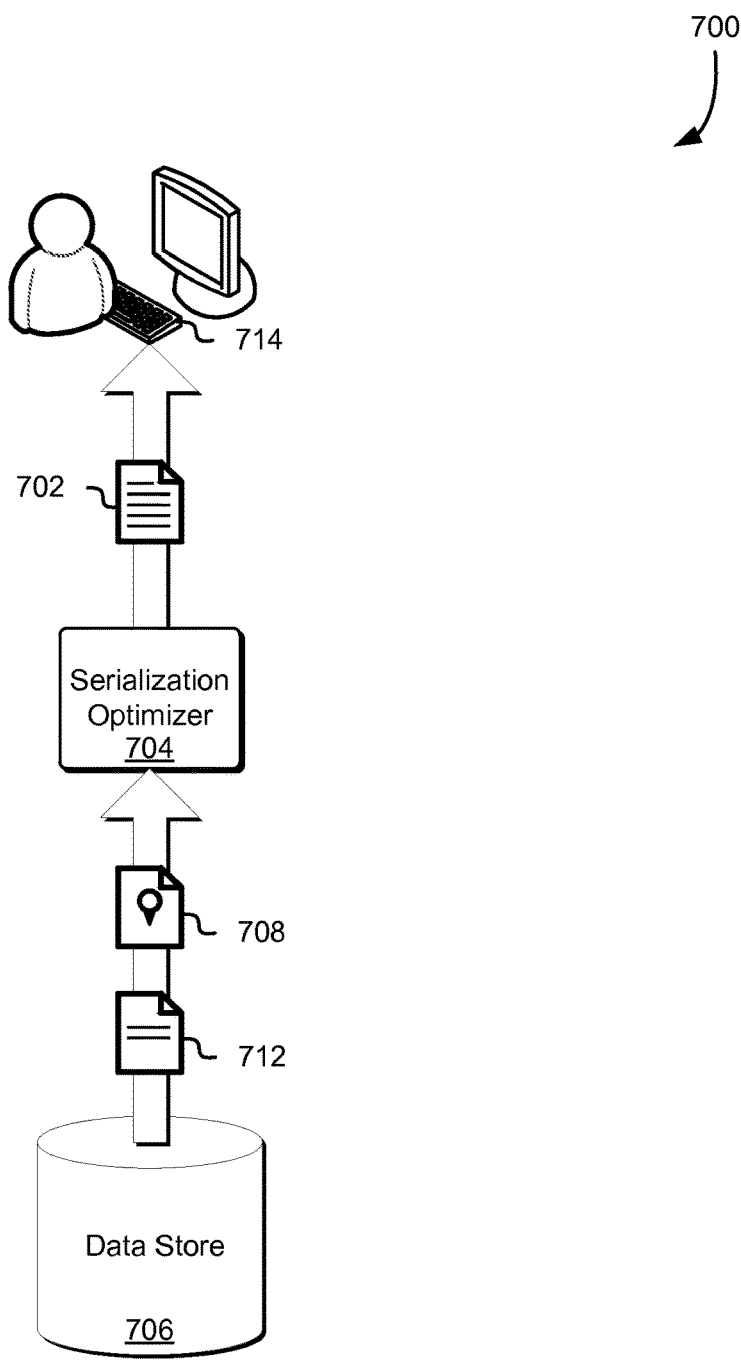
FIG. 7 illustrates an example of outputting a smaller data type value as a larger data type value in accordance with an embodiment.

FIG. 7 illustrates another scenario 700 of an embodiment of the present disclosure. Specifically, FIG. 7 depicts a serialization optimizer 704 retrieving a value 712 that has been stored in more than one byte in a data store 706, as indicated by a marker value 708, and outputting, to a requesting entity 714, that the value 712 have an output value 702 having a larger data type than the data type of the value 712. The data store 706 may be similar to the data store 106 described in conjunction with FIG. 1. The marker value 708 may be a value stored in a first byte (e.g., a first storage location) corresponding to the value 712, and may be devised to indicate how the value 712 was stored in the data store 706. For example, if the marker value 708 indicates that the value 712 was stored as a short integer, the serialization optimizer 704 may determine that the value 712 may be retrieved from the following two bytes (e.g., a second storage location). Similarly, if the marker value 708 indicates that the value 712 was stored in four bytes, the serialization optimizer 704 may retrieve the value 712 from the four bytes following the first byte. As another example, if the marker value 708 indicates that the value 712 was stored in eight bytes, the serialization optimizer may retrieve the value 712 from the eight bytes following the first byte that stored the marker value 708.

Note that other techniques for storing such data are also contemplated. For example, the data store 706 may be a database configured with multiple tables, with different tables corresponding to specific data types. For example, a first table may be dedicated to single byte values and marker values. In such an example, a first value may be retrieved from the first table, and if the first value is determined to be the actual value, as in the manner described in conjunction with FIG. 6, that value may be translated into the appropriate data type and output as the output value 602. On the other hand, if the value is determined to be a marker value, such as the marker value 708, the first table may include a field that links to an entry that corresponds to the data type indicated by the marker value 708. For example, if the marker value 708 indicates that the actual value is stored as a short integer or other 2-byte data type, the link field for this record may link to a record in a table configured to store 2-byte values, and so on. In any case, the value 712 may be a value that was stored in the data store 706 similar to the manner of the value 412 of FIG. 4.

The serialization optimizer 704 may be similar to the serialization optimizer 204 of FIG. 2. The serialization optimizer 704 next converts/translates/transforms/casts the value 712 into the desired data type for the output value 702. In other words, if the output value 702 is desired to be a double-precision floating-point number, the value 712 may be translated to a double-precision floating-point number to be output as the output value 702. The requesting entity 714 may be similar to the requesting entity 714 of FIG. 6, such as a customer of a computing resource service provider or other entity authorized to request and receive the output value 702.

Figure 8:
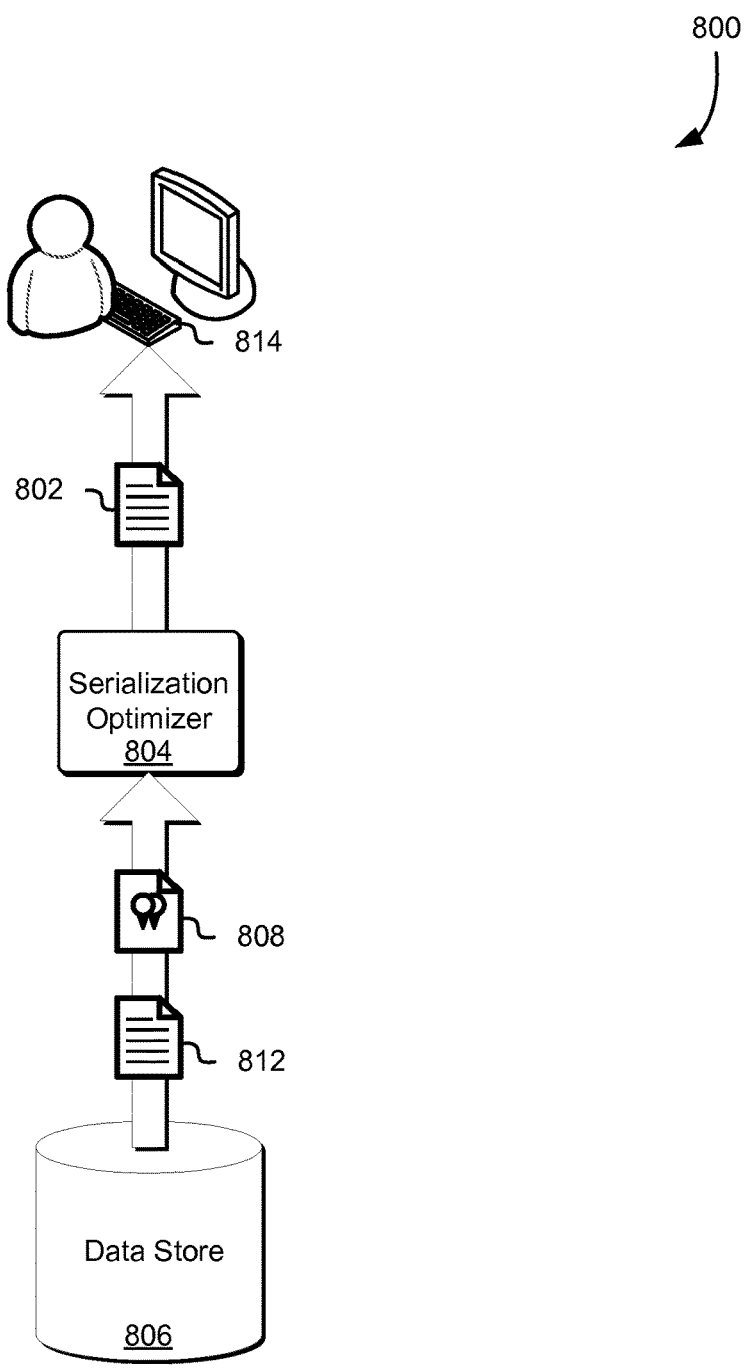
FIG. 8 illustrates an example of outputting a large data type value as its current data type in accordance with an embodiment.

FIG. 8 illustrates still another scenario 800 of an embodiment of the present disclosure. Specifically, FIG. 8 depicts a serialization optimizer 802 retrieving a value 812 that has been stored in the same format in a data store 806, as indicated by a marker value 808, as the data type desired for the output value 802 by a requesting entity 814.

The data store 806 may be similar to the data store 106 described in conjunction with FIG. 1. The marker value 808 may be a value stored in a first byte (e.g., a first storage location) corresponding to the value 812, and may be devised to indicate how the value 812 was stored in the data store 806. For example, if the marker value 808 indicates that the value 812 was stored as a double-precision floating-point number, the serialization optimizer 804 may determine that the value 812 may be retrieved from the eight bytes following the first byte (e.g., a second storage location).

The serialization optimizer 804 may be similar to the serialization optimizer 204 of FIG. 2. In this scenario 800, the output data type is a double-precision floating-point number, the marker value 808 indicates that the value 812 has been stored as a double-precision floating-point number, and, consequently, the serialization optimizer may be able to output the value 812 directly as the output value 802 without needing to translate the value 812 into a different data type. As with the requesting entities 614 and 714, the requesting entity 814 may be a customer of a computing resource service provider or other entity authorized to request and receive the output value 802.

In alternate embodiment, at least some marker values may represent actual input values that are too large to be stored in a single byte. For example, in some cases, although the input data may be received as double-precision floating-point numbers, many of the received input values are identical/duplicate. For example, if 10% of the input values equal 2,897,423, a marker value of 253 may indicate that the particular input value is 2,897,423. In this manner, storage space is not wasted to store multiple values of 2,897,423. Expanding on this embodiment, one or more marker values may map to a lookup table for frequently occurring input values. In such embodiments, after these input values are read back from storage, the marker values that correspond to values in the lookup table effectively instruct the serialization optimizer to obtain the actual value from the lookup table. Note that the larger the frequently occurring values are, the greater the benefit in storage space conservation and storage speed can be. For example, if the frequently occurring value requires a megabyte of space, each time it receives input value, only one byte (for storing the marker value reserved for it) of storage is needed.

As another example application, an embodiment of the present disclosure could be used for storing pixel values of image data. For example, an image may be captured and may be required to be stored in true color (24-bit) format, which requires that, for each color channel (e.g., red, green, blue, and alpha, etc.) for each pixel, one byte is used to store the value for that channel. However, if the system of the embodiment of the present disclosure determines that a particular pixel may be represented using a lower bit format (e.g., 16-bit, 8-bit, 4-bit, etc.), it may determine to store the pixel value for that particular pixel with fewer bytes using the lower bit format. This may present an advantage of savings of storage space for images having a majority of pixels that can be stored as a lower bit format. After the image data is retrieved from storage, the serialization optimizer can dynamically convert the lower bit format pixels into the higher bit format of the final image without a loss of image quality.

Figure 9:
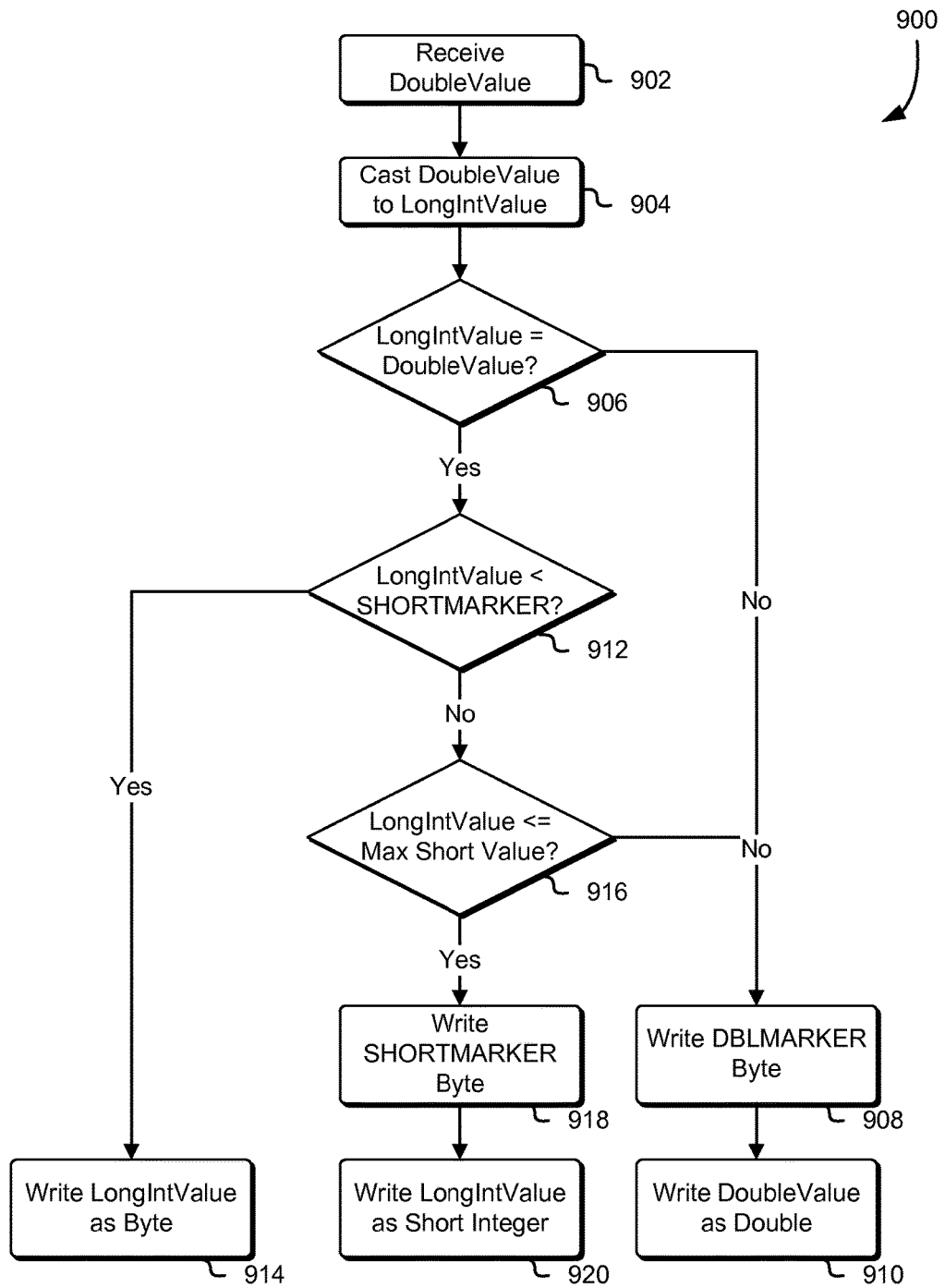
FIG. 9 is a flowchart that illustrates an example of serializing an input value in accordance with an embodiment.

FIG. 9 is a flowchart illustrating an example of a process 900 for serializing and storing input data in accordance with various embodiments. Some or all of the process 900 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 11:
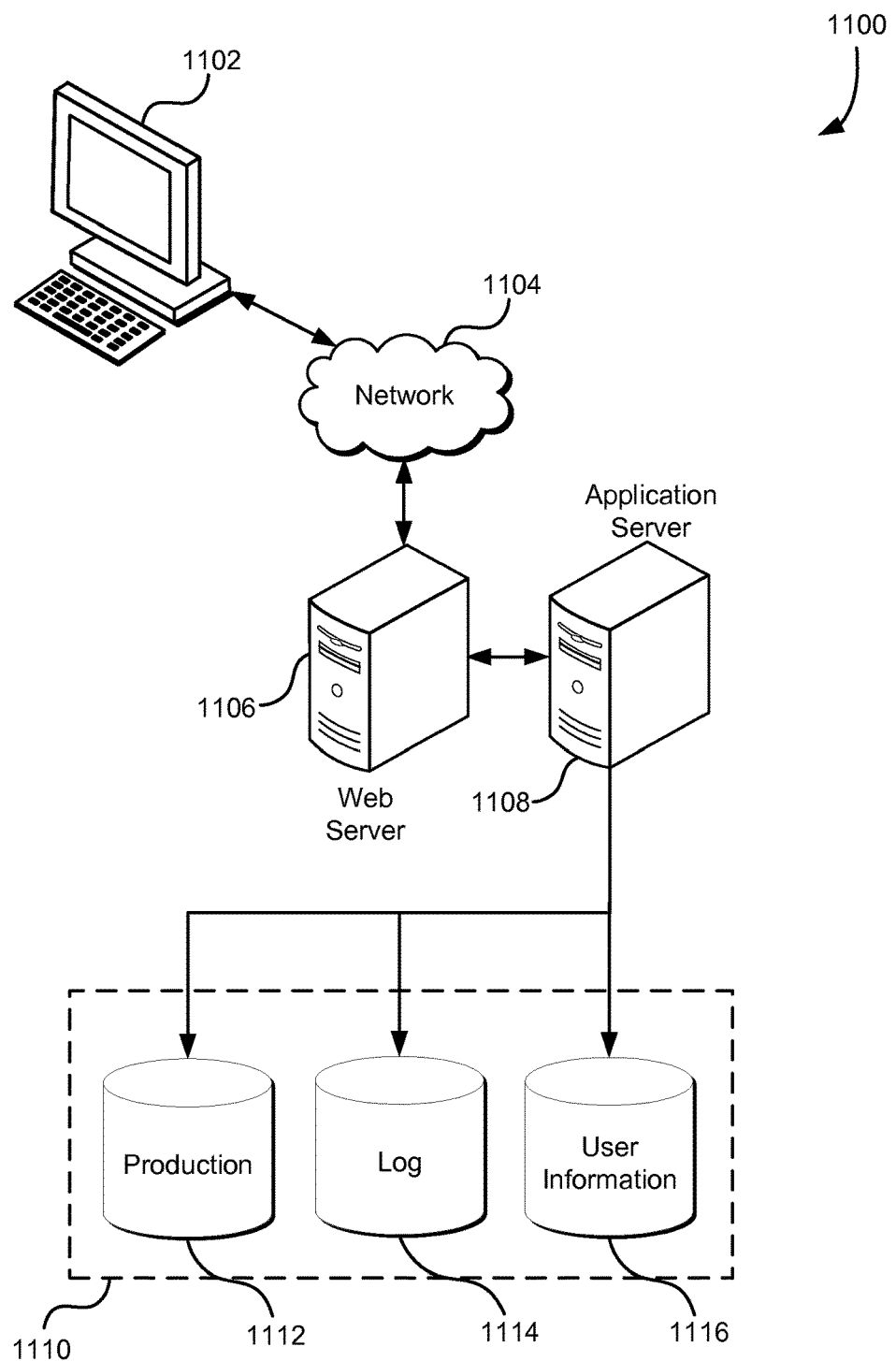
FIG. 11 illustrates an environment in which various embodiments can be implemented.

For example, some or all of process 900 may be performed by any suitable system, such as a server in a data center, by various components of the environment 1100 described in conjunction with FIG. 11, such as the web server 1106 or the application server 1108, by multiple computing devices in a distributed system of a computing resource service provider, or by any electronic client device such as the electronic client device 1102. The process 900 includes a series of operations wherein an input value is received as a first data type and, based on the actual value of the input value, the system performing the process 900 determines whether the actual value may be more efficiently stored as a different data type.

In 902, an input value is received as a double-precision floating-point data type. Note that the double-precision floating-point data type is used in 902 for illustrative purposes only, and any data type up to a data type requiring N bytes of storage may be used, dependent only on limitations of the hardware or software of the system performing the process 900. In 904, the input value is cast/translated to a variable having a long integer data type, such as an int64 8-byte integer. As noted, this data type is selected in FIG. 9 for illustrative purposes only, and may be a different integer or other data type as needed. For example, it should be noted that the data types stored via process 900 are byte, short, and double. Consequently, in some implementations the input value may be cast/translated to a variable having a short integer data type with little other change to the process 900. However, in some implementations (e.g., depending on programming language, operating system, or hardware), it may be desirable to cast/translate the input value into an integer type of the same or greater width than the data type of the input value, in order to minimize the risk of loss of precision. For the process 900, the input value is copied or translated into a long integer data type to determine whether, in 906, the actual value may be represented at least with a long integer. In other words, in 906, if the value within the long integer does not match the double-precision floating-point number, the system performing the process 900 may determine that the actual value cannot be represented (i.e., expressed) as a long integer without a loss of precision, and proceed to 908. Note that in some embodiments, for various reasons, it may be preferable to store negative values as the original input data type, even though such negative values may otherwise be translatable to an integer without loss of precision. In such embodiments, the operations of 906 may include an additional check to determine whether the input value is greater than or equal to zero, and if not, the system performing the process 900 may proceed to 908.

Note also that in some applications, some loss of precision, or a small loss of precision, may be acceptable. In such cases, the operations of 906 may include operations that determine whether, supposing there is a loss of precision, the precision loss is within an acceptable tolerance. If so, the system performing the process 900 may proceed to 912. For example, as noted elsewhere in this disclosure, some implementations may support storing data as single-precision floating-point numbers. However, double-precision floating-point numbers typically have at least 15 significant decimal digits of precision, whereas single-precision floating-point numbers have nine or fewer significant decimal digits of precision. Thus, with respect to input values for applications requiring only nine significant decimal digits of precision, if translating from double-precision floating-point number to single-precision floating-point number results in a loss of less than six significant decimal digits of precision, the precision loss may be within an acceptable tolerance.

In 908, the system performing the process 900, having determined not to store the double-precision floating-point number as a different data type, initiates the steps to store the input value as a double-precision floating-point number. As an initial step, a marker value representing that the input value is being stored as a double-precision floating-point number is written first (e.g., in a first byte). The marker value serves as a header for the subsequent value being written (e.g., marker values of 255 or 254 may indicate that the data being stored is a double-precision floating-point number or short integer, respectively). Subsequently, in 910, the input value is written to storage as the original data type (i.e., the data type of the input value as received); that is, if the input value was received as an 8-byte double-precision floating-point number, as illustrated in FIG. 9, the input value would be written as this data type in the next eight bytes of storage.

Otherwise, if it was determined in 906 that the actual value could be represented as a long integer without a loss of precision, the system performing the process 900 proceeds to 912. In 912, the system determines whether the actual value of the input value is small enough to be stored in a single byte without encroaching on values reserved for marker values. For example, in FIG. 2, there may only be two reserved marker values: SHORTMARKER, which may be a fixed/static value of 254, representing a short integer, and DBLMARKER, which may be a fixed/static value of 255, representing a double-precision floating-point number. Thus, if the input value is less than the smallest marker value, the system performing the process 900 may determine to proceed to 914.

In 914, the system performing the process 900 proceeds to store the input value in a first storage location (e.g., a first byte). Because the stored value is less than the smallest marker value, if the storage location is read at a later time, it can be determined that, since the value at that first storage location does not match the marker value, the value at that storage location is the actual value sought. Otherwise, if the input value is greater than the smallest marker value, the system performing the process may proceed to 916.

At 916, the system performing the process 900 may make a determination whether the actual value can be stored as the next smallest data type, which in the example of FIG. 9, is a 2-byte short integer. The system determines whether the input value is less than the largest possible short integer (i.e., 0xffff). If not, the system performing the process 900 may proceed to 908 to perform the operations of storing the input value as the original data type.

Note that, although the process 900 only illustrates storing the input value as a 1-byte integer, a 2-byte short integer, and an 8-byte double-precision floating-point number, it should be apparent that the system of the present disclosure may in practice include checks against additional marker values and additional data types. For example, additional operations between 916 and 918 could be present to determine whether the input value, although too large to be stored as a short integer, may however be small enough to be stored as 4-bit long integer (int32), and operations so doing may be performed (e.g., write LONGMARKER byte, write LongInt-Value as int32 integer, etc.). Furthermore, it must be noted too that even though in 906 it may be determined that the input value cannot be stored as a long integer without loss of precision, rather than proceeding directly to 908, the system performing the process may perform additional operations to determine whether the input value can be stored as a single-precision floating-point number or some other data type. If so, operations may be performed for so doing, rather than proceeding to 908 to write the input value as the original data type.

In addition, as has been noted, the input value is not limited to 8-byte data types, but could be 16-byte, 32-byte, N-byte data types, or even variable length data types. If so, the system performing the process 900 may proceed to 918. Similar to the operations performed in 908, in 918, the system, having determined that the input value is too large to store in a single byte but small enough to store as a short integer, first writes the marker value indicating that the value to be written will be a short integer (e.g., 254). Then, in 920, the input value may be written to storage as a 2-byte short integer. Note that one or more of the operations performed in 902-20 may be performed in various orders and combinations, including in parallel. For example, it is contemplated that an alternate method may be to, instead of performing the operations 904-16, the system may attempt to translate the input value into a single byte data value, and, if successful, without a loss of precision, and if the input value does not match a marker value, the system may directly write that input value into a single byte of data. If unsuccessful, the system may attempt to translate the input value into a next smallest data type (e.g., 2-byte short integer) without loss of precision, and so on, repeating the check at each next smallest data type until either the smallest supported data type that the input value can be cast to without a loss of precision being detected, or the system determines to write the input value as the original data type.

Whether the process described above or the process illustrated in FIG. 9 or some other similar process is used, may be dependent upon which process achieves the best balance between speed and resource (e.g., memory, processor, storage space) usage/overhead. Achieving the best balance may also be a factor of the input values received in 902. As noted, the process 900 depicts only storing input values as 1-byte, 2-byte, and 8-byte data types, omitting 4-byte data types. In general, a goal may be to determine a data type that utilizes less memory for storage than the data type of the input value. In many cases, this may involve determining the data type from a set of predetermined data types (e.g., byte and short, or byte, short, and int32, etc.) that can store the input value, without a loss of precision, while utilizing the least amount of space. This may be because in the particular implementation, serializing 1-byte and 2-byte data from 8-byte data (and vice versa for deserialization) provides sufficient storage savings when balanced against the resource cost/overhead to serialize/deserialize, whereas, in the process of serializing 4-byte data from 8-byte data (or vice versa), the resource cost may outweigh the diminished storage savings achieved. However, it is contemplated that in some implementations, it may be desirable to store the input value as a data type of the predetermined set of data types that does not necessarily utilize the least amount of space. For example, if, under certain conditions, the overhead required to serialize/deserialize a double-precision floating-point number to/from a short integer outweighs the overhead of serializing/deserializing the same double-precision floating-point number to/from a single-precision floating-point number, it may be determined to be preferable to store the input value as a single-precision floating-point number over a short integer, even though the short integer would utilize less space for storage.

Figure 10:
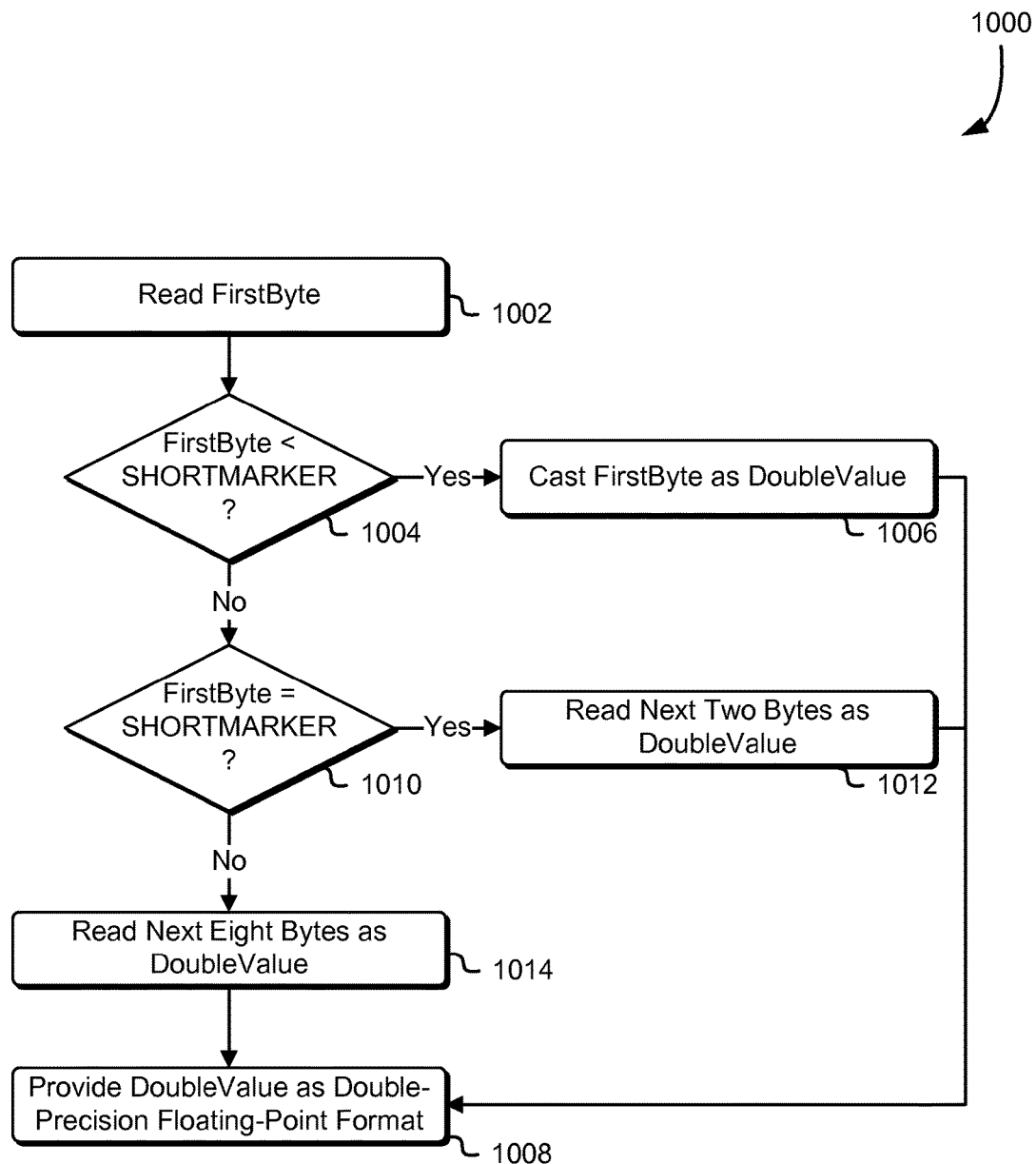
FIG. 10 is a flowchart that illustrates an example of deserializing a stored input value in accordance with an embodiment.

FIG. 10 is a flowchart illustrating an example of a process 1000 for reading and deserializing values that have been stored in accordance with various embodiments, such as the embodiment depicted in FIG. 9. Some or all of the process 1000 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1000 may be performed by any suitable system, such as a server in a data center, by various components of the environment 1100 described in conjunction with FIG. 11, such as the web server 1106 or the application server 1108, by multiple computing devices in a distributed system of a computing resource service provider, or by any electronic client device such as the electronic client device 1102. The process 1000 includes a series of operations wherein a first byte of data is read, a determination is made whether the first byte of data contains a marker value, and based on that determination the system performing the process 1000 determines from where to obtain the output value.

In 1002, the first byte of the storage location corresponding to the value being sought is read. In 1004, the system performing the process 1000 determines whether the value read from the first byte corresponds to any marker values that may have been stored in that location. This determination may be made in various ways. However, in at least some embodiments of the present disclosure, the marker values may be stored as the uppermost values that may be stored in a byte of data. Thus, it can be quickly determined whether or not the first byte value is a marker value by determining whether the first byte value is less than the smallest marker value. The operations of 1004 make the determination in this manner by determining whether the first byte value is less than the short integer marker value (i.e., SHORTMARKER). If so, then the first byte value is the actual value being sought, and the system performing the process proceeds to 1006. Note, however, that in various implementations, marker values may be a range of lowermost values of a byte, rather than a range of uppermost values. Alternatively, in some implementations, marker values may be a mid-range of values in a byte. In still other implementations, all marker values may not be a contiguous range of values, but may be interspersed groups of values within the byte. In even other implementations, marker values (and the first storage location) may be multiple-bytes in length, rather than a single byte.

In 1006, the system translates the first byte value into the data type desired for output. In the illustrative example of FIG. 10, this includes translating the first byte value into a double-precision floating-point number. Then, in 1008, the system provides the output value to the destination entity. The destination entity could be a customer of a computing resource service provider for whom the data was collected and who is now requesting a copy of the collected data. The destination entity could be a software application or a service of the computing resource service provider seeking to retrieve and analyze the collected data for any of a variety of purposes (e.g., generating graphs, billing computations, standard deviations, etc.).

Otherwise, if the value of the first byte is determined not to be the actual value in 1004, the system performing the process 1000 may proceed to 1010. In 1010, the system determines whether the value of the first byte matches a first marker value, which, in the illustrative example of FIG. 10, may be the value corresponding to a short integer. However, as noted elsewhere, it is contemplated that operations may be performed in various orders and that marker values corresponding to different data types than those depicted in FIG. 10 are also contemplated. Thus, in some embodiments, rather than checking for a marker value corresponding to a short integer, in 1010, the system may alternatively check for a marker value corresponding to a double-precision floating-point number (and, if found, may proceed accordingly).

Returning to the illustrative example of FIG. 10, if the first byte is determined to match a first marker value, the system performing the process 1000 may proceed to 1012. In 1012, the system reads an amount of data following the first byte that corresponds to the marker value detected. That is, if the marker value corresponds to a short integer, the system may read the next two bytes in 1012 in order to obtain the output value. Then, the system performing the process 1000 may proceed to 1008, whereupon the output value may be output as the desired data type.

Otherwise, if in 1010, the first byte was determined not to match the first marker value, the system may determine that the value was stored as an original data type (e.g., double-precision floating-point number), the system performing the process 1000 may proceed to 1014 and read an amount of data following the first byte that corresponds to this original data type (e.g., for a double-precision floating-point number, reading the next eight bytes). Note that any number of different marker values may be checked for, and if found, may be obtained in a similar manner as described in 1012 (e.g., int32 integers, int64 integers, single-precision floating-point numbers, etc.), but the particular embodiment depicted in FIG. 10 may be configured to store input values as 1-byte, two-byte, or 8-byte values. After reading the value in 1014, the system may proceed to 1008, whereupon the value may be output as the desired format to the destination entity. Note that one or more of the operations performed in 1002-20 may be performed in various orders and combinations, including in parallel.

Note, is contemplated that the techniques of the present disclosure may be applied to other methods of storing data and other units of data. For example, in the realm of quantum computing, the basic unit of data is a quantum bit (qubit). Eight qubits make up a quantum byte (qubyte). An application of techniques of the present disclosure to quantum computing may be, upon receiving input data in a data format having 8-qubytes, that the system may determine whether the data can be stored within a single qubyte, 2-qubytes, or 4-qubytes without a loss of precision. Marker values may be used for indicating the data type that the quantum data is being stored. Upon output, the qubytes may be read and translated to a desired data type for output.

In the context of describing disclosed embodiments, unless otherwise specified, use of expressions regarding executable instructions (also referred to as code, applications, agents, etc.) for performing operations that "instructions" do not ordinarily perform unaided (e.g., transmission of data, calculations, etc.) denote that the instructions are being executed by a machine, thereby causing the machine to perform the specified operations.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 1104 can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network 1104 can be enabled by wired or wireless connections and combinations thereof. In this example, the network 1104 includes the Internet, as the environment includes a web server 1106 for receiving requests and serving content in response thereto, although for other networks an alternative device serving a similar purpose could be used as would be apparent to one of ordinary skill in the art.

The illustrative environment includes an application server 1108 and a data store 1110. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 1108 can include any appropriate hardware, software and firmware for integrating with the data store 1110 as needed to execute aspects of one or more applications for the electronic client device 1102, handling some or all of the data access and business logic for an application. The application server 1108 may provide access control services in cooperation with the data store 1110 and is able to generate content including, text, graphics, audio, video and/or other content usable to be provided to the user, which may be served to the user by the web server 1106 in the form of HyperText Markup Language ("HTML"), Extensible Markup Language ("XML"), JavaScript, Cascading Style Sheets ("CSS"), or another appropriate client-side structured language. Content transferred to a client device may be processed by the electronic client device 1102 to provide the content in one or more forms including, forms that are perceptible to the user audibly, visually and/or through other senses. The handling of all requests and responses, as well as the delivery of content between the electronic client device 1102 and the application server 1108, can be handled by the web server 1106 using PHP: Hypertext Preprocessor ("PHP"), Python, Ruby, Perl, Java, HTML, XML, or another appropriate server-side structured language in this example. Further, operations described as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store 1110 may include mechanisms for storing production data 1112 and user information 1116, which can be used to serve content for the production side. The data store 1110 also is shown to include a mechanism for storing log data 1114, which can be used for reporting, analysis or other purposes. It should be understood that there can be many other aspects that may need to be stored in the data store 1110, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server 1108. In one example, a user, through a device operated by the user, might submit a search request for a certain type of item. In this case, the data store 1110 might access the user information 1116 to verify the identity of the user and can access the catalog detail information to obtain information about items of that type. The information then can be returned to the user, such as in a results listing on a web page that the user is able to view via a browser on the electronic client device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, as a result of being executed by a processor of the server, allow the server to perform its intended functions. The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the example environment 1100 in FIG. 11 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 1104 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 1104. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," where unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. Further, in some examples, computer systems are configured to implement one or more services that collectively perform operations of processes described herein. Such computer systems, for instance, may be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:
1. A system, comprising:
one or more processors; and
memory including instructions that, as a result of being executed by the one or more processors, cause the system to:
obtain an input value having a first data type format, the first data type format having a particular byte length;
determine whether the input value is capable of being stored, without losing precision, in at least one format of a set of data type formats;

on a condition that the input value is determined to be capable of being stored, without losing precision, as the at least one format:
  determine a data type format of the set of data type formats that utilizes less memory to store the input value, without losing precision, than the first data type format; and
  determine, based at least in part on the data type format determined, to either:
    store the input value in a first storage location, or
    store a first marker value in the first storage location and the input value in a second storage location; and
on a condition that the input value is determined to be incapable of being stored, without losing precision, as at least one format of the set of data type formats, store a second marker value in the first storage location and the input value in the second storage location.

2. The system of claim 1, wherein the instructions that cause the system to determine that the input value is incapable of being stored as at least one data type of the set of data type formats include instructions that cause the system to make the determination that the input value is incapable of being stored as at least one data type of the set of data types if the input value is negative.

3. The system of claim 1, wherein:
the input value is one of a plurality of input values obtained by the system; and
as a result of being obtained by the system, at least a predetermined percentage of the plurality of input values:
  are determined not to match a marker value of a plurality of marker values;
  are determined to be capable of being stored as a data type that can utilize less memory than the first data type format, without losing precision; and
  are stored in the first storage location.

4. The system of claim 1, wherein the instructions that cause the system to determine the data type format and store the input value based at least in part on the data type format determined include instructions that cause the system to, if the input value is determined not to match a marker value of a plurality of marker values and the input value can be stored, without losing precision, as a second data type:
  determine that the data type is the second data type; and
  store the input value in the first storage location.

5. The system of claim 1, wherein the instructions that cause the system to determine the data type format and store the input value based at least in part on the data type determined include instructions that cause the system to, if the input value is determined to match a marker value of a plurality of marker values or the input value cannot be stored, without losing precision, as a second data type, but can be stored, without losing precision, as a third data type:
  determine that the data type format is the third data type;
  store the first marker value in the first storage location; and
  store the input value in the second storage location.

6. The system of claim 1, wherein an amount of storage allocated to the second storage location is based at least in part on stored contents of the first storage location.

7. The system of claim 1, wherein the instructions further include instructions that cause the system to:
  receive a request to retrieve, as a particular data type, the input value stored; and
  as a result of receiving the request:
    obtain a first obtained value from the first storage location;
    if the first obtained value does not match a marker value of a plurality of marker values, respond to the request with the first obtained value translated to the particular data type; and
    if the first obtained value matches a marker value of the plurality of marker values:
      obtain a second obtained value from the second storage location; and
      respond to the request with the second obtained value translated to the particular data type.

8. The system of claim 1, wherein the data type format of the set of data type formats that can utilize less memory than the first data type format to store the input value, without losing precision, is the data type of the set of data types that can utilize a least amount of memory of set of data types to store the input value.

9. A computer-implemented method, comprising:
at a computer system that stores an obtained value in a first storage location on a condition that the obtained value is capable of being stored as a first data type without losing precision:
  obtaining a first value;
  determining that the first value is incapable of being stored as the first data type without losing precision by at least determining that the first value is either within or exceeds a range of values reserved for a plurality of marker values, the first value having a particular byte length;
  determining that the first value is capable of being stored as a second data type without losing precision;
  storing a marker value in the first storage location, the marker value being of the plurality of marker values and indicating that a second storage location holds the first value; and
  storing the first value in the second storage location as the second data type.

10. The computer-implemented method of claim 9, wherein:
the first value is obtained as a data type whose scheme for storing a value requires at least eight bytes of storage;
the first data type is a data type whose scheme for storing a value requires one byte of storage; and
the second data type is a data type whose scheme for storing a value requires two bytes of storage.

11. The computer-implemented method of claim 9, wherein:
the first storage location is a first byte; and
the second storage location includes a number of bytes following the first byte, the number based at least in part on the second data type.

12. The computer-implemented method of claim 9, wherein
determining that the first value is capable of being stored as a second data type includes:
  translating the first value into the second data type to yield a second value; and
  determining whether the second value, if translated back to a data type of the first value, equals the first value.

13. The computer-implemented method of claim 9, wherein determining that the first value is capable of being stored as a second data type without losing precision includes determining that the first value is not negative.

14. The computer-implemented method of claim 9, wherein:
the plurality of marker values indicate a particular data type; and
the range of values that are reserved for the plurality of marker values can be expressed in the first data type.

15. A non-transitory computer-readable storage medium having stored thereon executable instructions that, as a result of being executed by one or more processors of a computer system, cause the computer system to at least:
obtain a first value;
determine that the first value is incapable of being stored as a first data type of a set of data types without losing precision;
determine that the first value is capable of being stored as a second data type of a set of data types other than the first data type without losing precision;
store a marker value in a first storage location, the first storage location on a condition that an first obtained value storing in the first storage location is capable of being stored as the first data type without losing precision, the marker value indicating that a second storage location holds the first value;
store the first value in the second storage location as the second data type;
obtain a first stored value from the first storage location;
determine that the first stored value matches the marker value indicating that the second storage location holds a second stored value of the second data type;
obtain the second stored value from the second storage location to yield an second obtained value; and
provide, as output, the second obtained value as a third data type.

16. The non-transitory computer-readable storage medium of claim 15, wherein:
the first storage location is a first byte of storage at a first location assigned to the first value; and
the second storage location is zero or more subsequent bytes of storage at a second location assigned to the first value, a quantity of the zero or more subsequent bytes being determinable based at least in part on a data type indicated by a value stored in the first storage location.

17. The non-transitory computer-readable storage medium of claim 15, wherein determining that the first value is capable of being stored as a second data type of a set of data types other than the first data type without losing precision includes determining that the first value is not negative.

18. The non-transitory computer-readable storage medium of claim 15, wherein:
the first data type is a data type whose scheme for storing a value requires one byte of storage; and
the second data type is a data type whose scheme for storing a value requires two bytes of storage.

19. The non-transitory computer-readable storage medium of claim 15, wherein:
the first storage location is a first byte of storage at a first location assigned to the first value; and
the second storage location is zero or more subsequent bytes of storage at a second location assigned to the first value, a quantity of the zero or more subsequent bytes being determinable based at least in part on a data type indicated by a value stored in the first storage location.

20. The non-transitory computer-readable storage medium of claim 15, wherein an amount of storage allocated to the second storage location is based at least in part on stored contents of the first storage location.

* * * * *